United States Patent
Gibbons et al.

[11] Patent Number: 5,853,683
[45] Date of Patent: Dec. 29, 1998

[54] HYBRID SCR/SNCR PROCESS

[75] Inventors: Francis X. Gibbons, Toms River; Alexander L. Huhmann, Woodbridge; Albert J. Wallace, Colonia, all of N.J.

[73] Assignee: Public Services Electric & Gas Corporation, Newark, N.J.

[21] Appl. No.: 840,841

[22] Filed: Apr. 17, 1997

Related U.S. Application Data

[63] Continuation-in-part of Ser. No. 492,140, Jun. 19, 1995, abandoned.

[51] Int. Cl.$^6$ ............................................. B01J 8/00
[52] U.S. Cl. ........................................ 423/239.1; 423/235
[58] Field of Search ................................. 423/235, 239.1

[56] References Cited

U.S. PATENT DOCUMENTS

| | | |
|---|---|---|
| 4,297,319 | 10/1981 | Ishibashi et al. . |
| 4,302,431 | 11/1981 | Atsukawa et al. . |
| 4,423,017 | 12/1983 | Dean . |
| 4,978,514 | 12/1990 | Hofmann et al. . |
| 4,981,660 | 1/1991 | Leach . |
| 5,057,293 | 10/1991 | Epperly et al. . |
| 5,104,629 | 4/1992 | Dreschler . |
| 5,139,754 | 8/1992 | Luftglass et al. . |
| 5,233,934 | 8/1993 | Krigmont et al. . |
| 5,286,467 | 2/1994 | Sun et al. . |
| 5,510,092 | 4/1996 | Mansour et al. ............... 423/239.1 |

Primary Examiner—Michael L. Lewis
Assistant Examiner—Thomas G. Dunn, Jr.
Attorney, Agent, or Firm—Dowell & Dowell, P.C.

[57] ABSTRACT

A process for reducing the level of nitrogen oxides ($NO_x$) in a fossil fuel (e.g. coal) combustion flue gas has a selective non-catalytic reduction (SNCR) treatment stage followed by a selective catalytic reduction (SCR) treatment stage. The level of $NO_x$ produced by a power plant, particularly a coal fired power plant, varies depending upon the plant load. A set predetermined non-zero amount of first nitrogenous treatment agent is constantly introduced for the SNCR stage during all periods of plant operation. Additional first nitrogenous treatment agent is introduced for the SNCR stage only during periods of relatively higher $NO_x$ production, such as during peak load periods. A second nitrogenous treatment agent is added for the SCR stage up to the maximum SCR $NO_x$ reducing capability of the SCR stage based upon the total amount of $NO_x$ present in the flue gas, subject to limitations on the amount of allowable ammonia slip exiting the plant. Once the total amount of $NO_x$ in the flue gas surpasses a level which the SCR stage can effectively treat, additional first nitrogenous treatment agent is added to the SNCR stage. The amount of additional first nitrogenous treatment agent added is incrementally raised as the $NO_x$ level increases. During relatively lower $NO_x$ producing periods when the set non-zero amount of SNCR plus the SCR stage alone are effectively capable of reducing the level of $NO_x$ to the desired level without surpassing ammonia slip limits, no additional treatment agent is added for the SNCR stage.

10 Claims, 1 Drawing Sheet

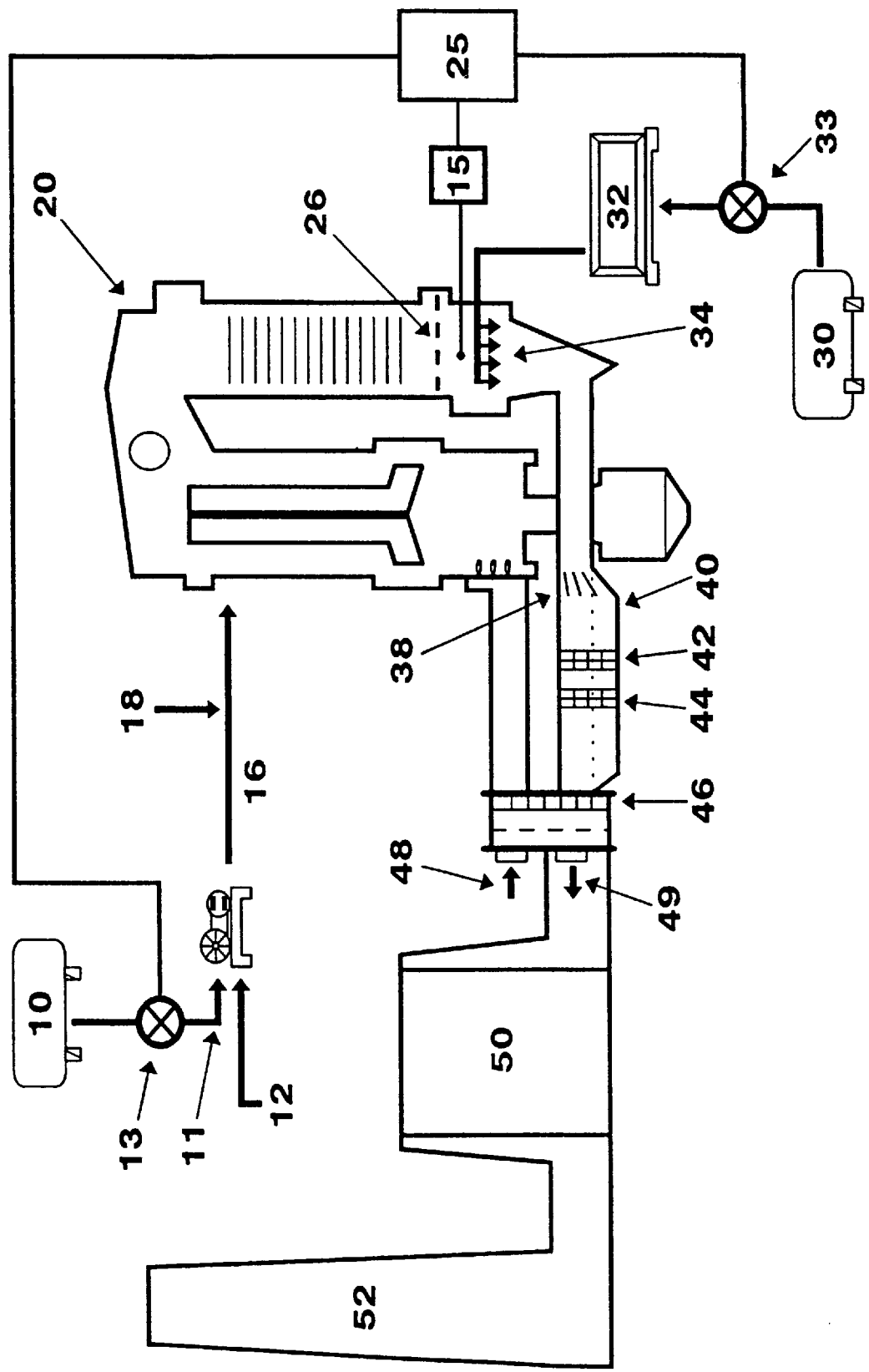

HYBRID SCR/SNCR PROCESS

CROSS REFERENCE TO RELATED APPLICATIONS

The present application is a continuation-in-part of U.S. application Ser. No. 08/492,140 filed Jun. 19, 1995, now abandoned.

BACKGROUND OF THE INVENTION

1. Field of the Invention

The invention relates generally to the reduction of nitrogen oxides from flue gas, and, more particularly, to a hybrid SNCR/SCR process for reducing the level of nitrogen oxides from the flue gas of a fossil fuel combustion fired boiler.

2. History of the Related Art

The combustion of fossil fuels (e.g. coal) in power plants to produce power also generates undesirable nitrogen oxides ($NO_x$), usually in the form of a combination of nitric oxide (NO) and nitrogen dioxide ($NO_2$). It is known that under certain operating conditions the $NO_x$ level in a flue stream can be lowered by reacting the $NO_x$ with ammonia to produce harmless water and nitrogen as products. The $NO_x$ reducing reaction with ammonia can occur at relatively high temperatures in the absence of a catalyst in a process known as selective non-catalytic reduction (SNCR). The reaction can also occur at significantly lower temperatures in the presence of certain catalysts in a process known as selective catalytic reduction (SCR).

Several processes have been disclosed that combine an SNCR process with an SCR process. Typically in the known so-called "hybrid" SNCR/SCR processes, an amount of ammonia or other nitrogenous treatment agent is introduced into the flue gas, usually in excess of the amount required for SNCR, while the flue gas temperature is still high enough to effectively promote the non-catalytic reduction of $NO_x$ by $NH_3$, typically in the range of 1600° F. to 2100° F. To extract additional $NO_x$ reduction, catalysts are typically installed downstream from the location of the SNCR temperature region at a point where the flue gas is at a temperature effective for the SCR process, typically in the range of 550° F. to 780° F. As the flue gas containing the excess ammonia remaining from the SNCR stage passes the catalyst, the excess ammonia reacts with the $NO_x$. In some of the known hybrid processes, the excess ammonia can be supplemented with additional ammonia or some other nitrogenous treatment agent introduced into the effluent from the SNCR stage. Typically in the known processes, a primary concern in the combining of SNCR and SCR is the ability to intentionally inject excess SNCR reagent, producing excess ammonia in the flue gas leaving the SNCR stage and eliminating the need for a second reagent source to provide all of the reagent for the SCR stage.

U.S. Pat. No. 4,302,431 to Atsukawa et al. discloses a process and apparatus for controlling nitrogen oxides in exhaust gases involving introducing ammonia into an exhaust gas at 700° C. (1292° F.) to 1300° C. (2372° F.), and then passing the exhaust gas over a catalyst at a temperature between 300° C. (572° F.) to 500° C. (932° F.) (preferably with the introduction of additional ammonia) to decompose remaining $NO_x$ and ammonia.

U.S. Pat. No. 4,978,514 to Hofmann et al. discloses a combined catalytic/non-catalytic process for nitrogen oxides reduction. The process of Hofmann et al. requires that, after the SNCR stage, sufficient ammonia is present in the effluent to react with the remaining effluent $NO_x$ in the catalyst stage. The Hofmann et al. process also utilizes an enhancer such as oxygenated hydrocarbons, heterocyclic hydrocarbons having at least one cyclic oxygen, sugar or molasses.

A related process is disclosed in U.S. Pat. No. 5,139,754 to Luftglass et al. The disclosed catalytic/non-catalytic combination process for nitrogen oxides reduction requires the introduction of a nitrogenous treatment agent for the non-catalytic stage in such an amount that ammonia remains in the treated non-catalytic effluent to be used for the SCR stage.

Another related patent, U.S. Pat. No. 5,286,467 to Sun et al. discloses a hybrid process for nitrogen oxides reduction in which a nitrogenous treatment agent other than ammonia is introduced in such a quantity that ammonia is present in the treated effluent leaving the non-catalytic stage. If the SNCR stage does not generate sufficient ammonia for the SCR portion, the process of the Sun et al. patent also provides a source of ammonia to make up the difference.

U.S. Pat. No. 4,981,660 to Leach discloses a selective hybrid $NO_x$ reduction process which utilizes an upright housing such as a natural draft heater tower. In the Leach process, a sufficient amount of reagent ammonia or ammonia radical must be added for the non-catalyst stage such that excess unreacted reagent remains for the catalyst stage.

U.S. Pat. No. 5,057,293 to Epperly et al. discloses a multi-stage process for reducing the concentration of pollutants in an effluent. The Epperly et al. multistage process can be combined with an SCR process. The Epperly et al. multi-stage process reduces the nitrogen oxides concentration in the effluent such that an approximately 1:1 ratio of ammonia to nitrogen oxides remains in the effluent exiting the SNCR stage to provide ammonia for the SCR stage.

U.S. Pat. No. 5,233,934 to Krigmont et al. discloses a control method of reducing $NO_x$ in flue gas streams utilizing an SNCR treatment followed by an SCR treatment. The Krigmont et al. method tries to maximize the $NO_x$ removal in the SNCR stage, subject to certain ammonia slip restrictions.

U.S. Pat. No. 5,510,092 to Mansour et al. discloses a combined SNCR/SCR process in which SCR is employed for primary NO reduction and $NH_3$ is injected into the SNCR zone only when the NO content of the SCR effluent exceeds a preselected design maximum value.

The known hybrid SNCR/SCR related processes typically attempt to maximize the efficiency of the SNCR so as to minimize the level of nitrogen oxides remaining in the flue gas for processing by the SCR stage, while simultaneously producing excess $NH_3$. During periods of low nitrogen oxides production, such as during low load operation, low excess air combustion conditions, or as a consequence of a specific burner firing pattern, treatment agent is added to run the SNCR stage, lowering the level of nitrogen oxides in the flue gas prior to the SCR stage such that full advantage of the SCR stage nitrogen oxides reducing capability is not taken.

A limitation of many of the known SNCR/SCR processes is that the intentional injection of excess reagent is not the least cost methodology of providing for ammonia reagent within flue gas, as some of the reagent injected for SNCR is invariably directed to form molecular nitrogen and water, without reacting with NO. This transformation of reagent to $N_2$ inefficiently wastes a portion of the SNCR reagent, and can increase operating cost significantly, particularly for high $NO_x$ production rate boilers.

The approach of the known SNCR/SCR processes does not maximize the utilization of reagent with respect to SCR. Accordingly, $NO_x$ removal achieved in the known SNCR/

SCR processes can be at a higher cost per ton of $NO_x$ removed, as the savings from avoiding a second reagent system do not compensate for the higher reagent supply cost, particularly in the case of high $NO_x$ producing boilers. This is principally due to: (a) the inefficient use of reagent for SNCR $NO_x$ reduction, and (b) significant mal-distributions in the flue gas flow in the convective section where the first (SNCR) reagent and second (SCR) reagent are injected, complicating the task of uniformly dispersing reagent, and generating unequal concentrations of the $NH_3/NO$ ratio entering the SCR catalyst. As such maldistributions become significant, localized regions form in the flue gas stream where insufficient $NH_3$ exists for reaction with NO, and/or insufficient NO exists for reduction by $NH_3$. Accordingly, the catalyst is not supplied with a uniform ratio of $NH_3$ to NO, and thus the capital investment is not completely utilized, increasing the levelized cost per ton of $NO_x$ removed.

Also, loss of catalyst activity over time in the SCR stage can be an expensive problem in the known processes. It is anticipated that catalyst activity decreases to such an extent after approximately 2 years of operation that either supplementary $NO_x$ control measures must be taken, or alternatively, a new catalyst must be utilized.

In light of the limitations of the known processes, there has been a need for a hybrid SNCR/SCR process that minimizes the $NO_x$ removal cost per ton from high $NO_x$ producing boilers by maximizing utilization of the SCR stage of the process such that the need for the higher operating cost SNCR stage is reduced. Also there has been a need for a hybrid SNCR/SCR process in which the use of the SNCR stage is adjusted only during power plant operating periods when particularly high levels of nitrogen oxides are produced, or when the catalyst employed for SCR begins to lose activity and the ability to control $NO_x$.

Thus an improved process for reducing the level of nitrogen oxides in a flue gas which combines a selective non-catalytic reduction step with a catalytic reduction step and overcomes and eliminates the deficiencies of the known processes, particularly in terms of poor SNCR reagent utilization, would be very beneficial.

SUMMARY OF THE INVENTION

The present invention has been made in view of the above-described inadequacies of the related art and has as an object to provide a new hybrid SNCR/SCR process particularly useful for high $NO_x$ emitting boilers which overcomes and eliminates the inadequacies of the prior art.

Another object of the present invention is to provide a process which maximizes utilization of the SCR stage of a hybrid SNCR/SCR process such that the need for using the SNCR stage is reduced to such an effect that the amount of $NO_x$ treated by the SNCR stage is adjusted only during power plant periods of high nitrogen oxides production.

Yet another object of the present invention is to provide a hybrid SNCR/SCR process which maximally utilizes the selective reduction capabilities of an SCR catalyst.

Still yet another object of the present invention is to provide a hybrid SNCR/SCR process which allows the SNCR component to provide for increased $NO_x$ removal, to compensate for the eventual long-term reduction in SCR $NO_x$ removal as the catalyst ages and suffers a decline in activity for reducing $NO_x$ with ammonia.

Even yet another object of the present invention is to provide a hybrid SNCR/SCR process that allows the SNCR component to operate with maximum $NO_x$ removal and maximum reagent utilization, effectuated by operating the SNCR process with virtually no residual $NO_x$, in contrast to purposely generating excess $NH_3$ which necessarily compromises the reagent utilization of the SNCR process, and as a result the total reagent utilization of the hybrid SNCR/SCR process.

To achieve the objects of the invention, as embodied and broadly discussed herein, the present invention is a process for reducing the level of nitrogen oxides in a fossil fuel combustion flue gas, and is particularly applicable to coal combustion boilers featuring inherently high $NO_x$ production rates. The process comprises a selective non-catalytic reduction (SNCR) treatment stage followed by a selective catalytic reduction (SCR) treatment stage. The level of nitrogen oxides produced by a power plant for which the present invention will be particularly beneficial, such as a coal fired power plant, varies significantly depending upon the plant load and the boiler operating conditions.

The reagent injection rate is carefully controlled to leave virtually no excess ammonia and to maximize reagent utilization by producing the products of elemental nitrogen and water exclusively by the desirably efficient reaction of the treatment agent with $NO_x$ and not in the undesirably wasteful reaction of the treatment agent with itself.

In one embodiment, a preselected set non-zero steady-state amount of a first nitrogenous treatment agent is continuously added in the SNCR stage during all periods when the plant is operating. This set amount will always be less than the amount which would leave any measurable amount of ammonia slip. Ideally this set amount will be the maximum amount of nitrogenous treatment agent necessary for stoichiometric SNCR reduction during plant operating conditions producing a minimum level of nitrogen oxides, leaving no readily measurable amount of excess ammonia remaining in the flue stream after the SNCR stage. A second nitrogenous treatment agent is added for the SCR stage up to the maximum SCR $NO_x$ capability for the SCR stage based upon the total amount of nitrogen oxides remaining in the flue gas, subject to limitations on the amount of allowable ammonia slip exiting the plant. Once the total amount of nitrogen oxides in the flue gas surpasses a level which can be effectively treated by the combination of the set steady-state amount of the first nitrogenous treatment agent with the maximum amount treatable by the SCR stage, additional first nitrogenous treatment agent is injected for the SNCR stage. The amount of first nitrogenous treatment agent added is raised incrementally as the boiler nitrogen oxides production level increases.

In an additional embodiment which can be utilized with the above embodiment, the first nitrogenous treatment agent is added for the SNCR stage to make up for the loss of catalyst activity over time in the SCR stage. Thus, the non-zero set steady-state amount of the first nitrogenous treatment agent added is increased over time as the catalyst activity decreases. It is anticipated that the catalyst activity will have decreased sufficiently after approximately 2 years of operation. At that time by utilizing this aspect of the present invention, the increased SNCR $NO_x$ removal will compensate for the compromised SCR $NO_x$ removal caused by the decreased activity of the catalyst.

The above and other additional objects and advantages of the present invention will become apparent from the detailed description which follows, considered in conjunction with the accompanying drawing figures.

BRIEF DESCRIPTION OF THE DRAWINGS

In the accompanying drawing:

FIG. 1 is a schematic illustration of a process in accordance with a preferred embodiment of the present invention.

DETAILED DESCRIPTION OF THE PREFERRED EMBODIMENT

To achieve the objects of the invention, a process in accordance with a preferred embodiment of the invention combines an SNCR process step with an SCR process step in a hybrid SNCR/SCR process so as to maximize the utilization of the $NO_x$ reducing capability of the SCR stage of the process subject to limitations on the amount of allowable ammonia slip.

FIG. 1 schematically illustrates a power plant for utilizing a hybrid SNCR/SCR process in accordance with the present invention. A carbonaceous fuel such as coal is combusted with air in the furnace 20 to produce, in addition to power, combustion products referred to herein as flue gas. The flue gas contains nitrogen oxides ($NO_x$), fly ash, and other undesirable pollutants.

The level (or amount) of nitrogen oxides in the flue gas is an important consideration in the process of the present invention. The nitrogen oxides level varies greatly during the operation of a single power plant boiler. Some power plant boilers can experience load changes of from 20% to 100% of their capacity during normal operation. Higher loads require the combustion of greater quantities of carbonaceous fuel within the same fixed furnace volume, increasing peak combustion temperatures and mixing of fuel and air, thus producing higher levels of nitrogen oxides. Furthermore, boiler process changes including varying levels of excess air, varying steam temperature, changing the type of fuel fired (e.g. natural gas, fuel oil, or coal), and changing the fuel preparation and pulverization processes can vary $NO_x$ production by a factor of three or more. Thus, greatly varying levels of nitrogen oxides are produced at different times by a single power plant boiler.

The process of the present invention is initially based on determining a maximum level of nitrogen oxides which could be removed using a combined SNCR/SCR process. This maximum level will differ for every installation, predominately based upon the amount and effectiveness of the catalyst used in the catalyst stage of the process. At these highest $NO_x$ producing conditions, the SNCR stage and the SCR stages will both be run at their maximum levels. The amount of catalyst utilized for the SCR stage of the present invention will be the amount necessary for the maximum load or, more typically, the amount that can be practically installed without incurring cost beyond a given limit or threshold as selected by the operating utility. Different boilers will feature different amounts of catalyst.

In one embodiment of the present invention, a baseline amount of treatment agent is continuously added for the SNCR stage. At certain plant operation periods the nitrogen oxides level in the flue gas is low enough that the desired level of nitrogen oxides reduction can be accomplished by utilizing the combination of the SNCR stage, with only the baseline amount of SNCR treatment agent, plus the SCR stage. At other times the level of nitrogen oxides in the flue gas is greater than the amount which can be effectively treated by the combination baseline SNCR stage plus the SCR and it is necessary to add additional treatment agent for the SNCR stage of the process.

Thus, there is provided in the process of the present invention, a first source of a nitrogenous treatment agent capable of effectively reducing some of the nitrogen oxides contained in the flue gas to water and elemental nitrogen in the process known as selective non-catalytic reduction (SNCR). The source of the nitrogenous treatment agent should be capable of injecting the treatment agent into the flue gas stream at a point where the temperature is greater than approximately 1600° F. and preferably at a point where the temperature is at most approximately 2100° F., as the SNCR process is effective at temperatures between approximately 1600° F. and approximately 2100° F.

For the purposes of this process, it will be assumed that "excess ammonia" is defined as an amount which can be effectively and reliably measured using currently commercially available continuous flue gas monitors. At present, commercially available flue gas monitors are limited in accuracy and repeatability. This is particularly true when such monitors are applied to such sulfur bearing fuels in a commercial environment, without the benefit of frequent attention by maintenance staff and plant personnel. Accordingly, based on these conditions for $NH_3$ monitor operations, 50 ppm is proposed as a concentration limit that can be detected in flue gas, and thus is the approximate threshold for excess ammonia. The amount of the first reagent injected should not be enough to produce excess ammonia for use by SCR as some of such excess ammonia is wasted by forming $N_2$.

One or more nitrogenous treatment agents effective for SNCR may be utilized for the SNCR stage of the present invention. Examples of known nitrogenous treatment agents effective for SNCR include ammonia and urea.

In FIG. 1, a storage facility 10 containing a first nitrogenous treatment agent is shown. During periods of relatively higher nitrogen oxides production, a valve 13 is adjusted to enable an increased amount of treatment agent from the storage facility 10 to enter and move through a first treatment agent stream 11.

The treatment agent stream 11 is mixed with a transport media stream 12, forming a first treatment agent/water mixture stream 16. The transport media 12 used is preferably water, but alternatively could be another liquid or a gaseous transport media. In one embodiment, during all periods of relatively lower nitrogen oxides production, the valve 13 remains open to permit only a preselected amount of treatment agent to flow through stream 11.

An atomizing air (or other gaseous transport media) stream 18 is combined with the first treatment agent/water mixture stream 16, and the resulting mixture 19 is introduced into a furnace 20, where it mixes with the flue gas. The SNCR process occurs in the furnace and the associated convective heat transfer section most effectively at temperatures of from approximately 1600° F. and approximately 2100° F. After the SNCR process has occurred, the SNCR treated flue gas is optionally directed to a static mixing grid 26 and from there, again optionally, to a second treatment agent grid 34.

A second treatment agent is stored in a second treatment agent storage facility 30. The second agent is directed from the storage facility 30 to a second treatment agent vaporizer 32 where the treatment agent is vaporized. The vaporized treatment agent is directed to a second treatment agent injection grid 34, where it is injected into and mixed with the SNCR treated flue gas.

The SNCR treated flue gas/second treatment agent mixture is optionally guided by guide vanes 38 through an expanded duct 40, through a first SCR catalyst bank 42 and then through a second SCR catalyst bank 44. The SCR stage of the process preferably proceeds in a horizontal in-duct reactor with the catalyst preferably comprised of vertically oriented plates. The SCR reaction occurs during passage through the first and second catalyst banks 42 and 44. The temperature of the flue gas as it passes through the SCR catalyst is preferably between approximately 300° F. and approximately 1000° F., and more preferably between approximately 450° F. and approximately 800° F. for the SCR reaction to effectively occur. The preferred flow rates through the catalyst banks are selected so that the catalyst space velocity is between about 4,000 and about 10,000 $h^{-1}$, based on actual flow conditions.

As mentioned above, a preselected set non-zero steady-state amount of a first nitrogenous treatment agent is continuously added for the SNCR stage. Referring to FIG. 1, the valve 13 is opened to allow the set amount of treatment agent into the stream for the SNCR stage. The set amount of treatment agent should always be set at an amount less than the amount which would leave any measurable amount of ammonia slip leaving the SNCR stage. Ideally this set amount will be the maximum amount of nitrogenous treatment agent necessary for stoichiometric SNCR reduction during plant operating conditions producing a minimum level of nitrogen oxides, leaving no readily measurable amount of excess ammonia remaining in the flue stream after the SNCR stage. A second nitrogenous treatment agent is added as necessary for the SCR stage up to the maximum SCR $NO_x$ capability for the SCR stage based upon the total amount of nitrogen oxides remaining in the flue gas, subject to limitations on the amount of allowable ammonia slip exiting the plant. Once the total amount of nitrogen oxides in the flue gas surpasses a level which can be effectively treated by the combination of the non-zero set steady-state amount of the first nitrogenous treatment agent with the maximum amount treatable by the SCR stage, additional first nitrogenous treatment agent is injected for the SNCR stage. The amount of first nitrogenous treatment agent added is raised incrementally as the boiler nitrogen oxides production level increases.

The process of the present invention uses a $NO_x$ level determining device 15 to determine the $NO_x$ level in the flue gas. The device 15 can be comprised of any effective apparatus for determining the $NO_x$ level in the flue gas after combustion, preferably after the SNCR stage, such as a commercially available flue gas monitoring instrument. Alternatively, the device 15 can be a unit for estimating the $NO_x$ level in the flue gas after combustion based upon the results of a parametric test program encompassing all major boiler operating parameters. If the device 15 is positioned in the flue stream after the SNCR stage, the $NO_x$ level prior to the SNCR stage can be easily calculated by taking into account the amount of SNCR treatment agent added.

The $NO_x$ level determining device 15 is connected to a control device 25, preferably a microprocessor based control unit. The control device 25 is programmed to turn the SNCR treatment agent valve 13 and the SCR treatment agent valve 33 at the appropriate times in the process, depending upon the $NO_x$ level in the flue gas as determined by level determining device 15.

In accordance with the invention, the second treatment agent may be any nitrogenous treatment agent effective for the selective catalytic reduction of nitrogen oxides, such as, for example, ammonia and the like.

The catalyst utilized in the first and second catalyst banks can be comprised of any catalyst material effective for the selective catalytic reduction of nitrogen oxides in the presence of ammonia and/or other nitrogenous treatment agents. Some of the known materials which can be used for catalysts for SCR comprise one or more of the following metals: copper, iridium, iron, manganese, palladium, platinum, rhodium, titanium, tungsten, vanadium, and oxides thereof.

An air heater 46, preferably of the Ljungstrom type, optionally having hot end catalyst sectors 47, can be provided to heat ambient air entering through an air inlet 48 to form a preheated combustion air source, which is directed to the boiler by duct 54.

The flue gas stream is sent to precipitator 50 and then exits the plant by means of stack 52.

In an additional embodiment, which can be utilized with the above embodiment, first nitrogenous treatment agent is added for the SNCR stage to make up for the loss of catalyst activity over time in the SCR stage. Thus the set steady-state amount of the first nitrogenous treatment agent added is increased over time as the catalyst activity decreases. It is anticipated that the catalyst activity will have decreased sufficiently after approximately 2 years of operation. At that time by utilizing this aspect of the present invention, the increased SNCR $NO_x$ removal will compensate for the compromised SCR $NO_x$ removal caused by the decreased activity of the catalyst.

The amount of the first reagent injected should always be at a level which minimizes the by-product ammonia in the gas, since some of such ammonia will be wasted by forming $N_2$.

The preceding provides a general description of a power plant utilizing embodiments of the present invention. Many aspects of the power plant not pertinent to the present invention have been omitted from the description. Furthermore, the present invention can be utilized with power plants which differ from the power plant set-up described.

The process conditions of the hybrid SNCR/SCR process of the present invention can provide a least cost compliance strategy by (a) first maximizing the $NO_x$ removal in the SCR stage of the process, by operating the $NH_3/NO$ ratio at the highest level possible subject to the restraint that the amount of ammonia slip exiting the SCR stage of the process is kept below a designated level (usually 5 to 25 ppm, depending upon downstream equipment and fuel type), thereby allowing the use of treatment reagent at 100% utilization, and employing the installed catalyst, and (b) then increasing SNCR reagent rates to increase $NO_x$ removal with higher boiler $NO_x$, while maximizing SNCR treatment reagent utilization and minimizing residual $NH_3$ to usually 5 to 25 ppm. In a case where boiler load is low and $NO_x$ production is at a minimum, in an embodiment of the present invention, only a set, fixed rate amount of SNCR reagent is introduced into the SNCR stage of the process, and the SCR stage is adjustably employed for all additional $NO_x$ removal. As load and $NO_x$ production increase to a point beyond which the set SNCR and the minimum SCR can treat, the amount of SNCR reagent introduced is increased accordingly.

As the activity of the catalyst employed in the SCR process decreases, and the SCR treatment reagent must be so decreased to maintain the amount of ammonia slip at the desired level, the $NO_x$ removal provided by the SCR process decreases. In order to maintain total $NO_x$ reduction constant, the set non-zero baseline amount of SNCR reagent introduced at all times in the process is increased accordingly.

The levelized cost of $NO_x$ removal per ton removed by SNCR can be dominated by reagent consumption cost rather than by capital requirement, and therefore treatment reagent utilization is extremely important, particularly for high $NO_x$ production boilers which require significantly more reagent than boilers that, due to fuel type or construction, produce relatively low $NO_x$ emissions. Thus, SNCR/SCR processes that do not maximize reagent utilization, and thus do not minimize reagent cost, increase the cost of $NO_x$ control on a levelized per ton basis. The hybrid combined SNCR/SCR process of the present invention minimizes the consumption of treatment reagent for the total process, by employing a second treatment reagent injection system to provide all of the treatment agent necessary for the SCR stage, and purposely operating the SNCR process to minimize $NH_3$ slip and thus minimize wasted treatment agent forming molecular nitrogen and water.

This second treatment reagent is preferably introduced at a location in the flue stream at a point proximate to the SCR reactor. The flue gas temperature at the point of introduction preferably is approximately the same as the SCR reactor temperature which helps to prevent the reagent from being wastefully reduced to molecular nitrogen before it can be utilized as a $NO_x$ reducing treatment agent, undesirably lowering reagent utilization from the achievable 100%. In addition, the location of the introduction of the second treatment agent proximate to the SCR reactor provides a uniform $NH_3/NO$ ratio for the SCR stage, maximizing catalyst utilization. The second treatment reagent injection system is preferably positioned as physically close to the SCR reactor as possible, while providing for adequate residence time for mixing between the reagent and the $NO_x$ in the flue gas. In general, this second reagent injection location should provide at least 0.5 second residence time for mixing and dispersion of the second reagent in the flue gas prior to entering the catalyst for reaction. This contrasts with the injection systems typically used in the known processes, which commonly inject SCR reagent within the boiler convective section, or following the furnace exit.

The process of the present invention utilizes the SNCR step to provide trim for SCR which is the opposite of how most of the known processes operate. The known processes typically utilize the SCR stage installed following SNCR to trim $NO_x$, after SNCR $NO_x$ reductions are achieved.

However, for high $NO_x$ producing boilers, utilizing SNCR to provide trim SCR can provide the least cost control strategy. A fixed investment for SCR can be maximized by deploying the second reagent system for SCR in such a manner to achieve 100% utilization, providing a distinct advantage over designs that do not maximize overall reagent utilization.

The hybrid SNCR/SCR process of the present invention is particularly advantageous when deployed with a wet-bottom, coal-fired boiler. Some of the known processes are based on the premise that any modest reduction in catalyst quantity for SCR as allowed by SNCR operation provide significant cost savings, thus offsetting the higher cost of SNCR induced by the inherently lower reagent utilization rate. Although a 40% reduction in catalyst volume may allow approximately 25 to 35% reduction in SCR reactor cost for a conventionally designed, vertically oriented reactor, reductions in catalyst volume of this magnitude are not as important for a coal-fired wet bottom class of boiler with respect to reducing the SCR reactor cost. Specifically, a 40% reduction in catalyst quantity for wet-bottom boilers may only allow a 10% reduction in reactor cost. This results because the bulk of SCR installation cost for this type of boiler is for the relocation of existing equipment at the furnace bottom slagtaps, and to expand flue gas duct cross section area allowing flue gas to pass through the catalyst section without significant erosion of catalyst or pressure drop. As a result, the total system installation cost is not as strongly dependent on the quantity of catalyst installed.

The present process combines SNCR and SCR technology in a manner that treats the two process independently, in terms of reagent injection, and thus maximizes the efficient utilization of both sources of reagent. During periods when it is necessary to utilize SNCR, the SNCR treatment reagent is injected under conditions that minimize the production of excess $NH_3$, some of which would wastefully form molecular nitrogen and water without reacting with $NO_x$. The second (SCR) reagent source is preferably injected at approximately the same temperature as the SCR process, and in close proximity to the catalyst to take advantage of a well-behaved and uniform flow field.

The combined SNCR/SCR operating strategy first maximizes the SCR investment, by maximizing the SCR $NH_3/NO$ ratio for a given residual $NH_3$ slip and catalyst activity, and thus $NO_x$ removal derived with the SCR investment; and secondly employs SNCR for trim, by maximizing SNCR reagent usage to increase SNCR-derived $NO_x$ removal. In this manner, the strategy for injecting the two reagents is driven by first maximizing $NO_x$ reduction by SCR, and then achieving further $NO_x$ removal with SNCR.

While the process of the present invention can be used on a conventional boiler having a dry bottom and vertically oriented gas flow, the process is particularly advantageous when used on a wet-bottom boiler, which maximizes the retention of fly ash in the furnace, thus minimizing the quantity of fly ash in the flue gas that may damage or degrade the catalyst. The low fly ash content also allows a horizontal reactor to be deployed, which accommodates the characteristic layout of the furnace and flue gas ductwork of a wet-bottom boiler, maximizing the volume of catalyst which can be utilized. Again, while the process could be used on a conventional vertically-oriented flue gas flow path SCR reactor, such a reactor may be very expensive to install, and sometimes may not be technically feasible due to space restraints. The significance of the wet-bottom boiler type and horizontal reactor geometry is that the capital cost of installing an SCR reactor does not significantly decrease with modest (20–40%) decreases in catalyst volume, as in a vertically-oriented SCR reactor, and thus the benefits of such modest reductions in catalyst quantity (as achieved by some of the known SNCR/SCR systems) do not provide significant overall financial savings.

Three examples demonstrate the efficacy of this approach. Each of these examples is based on the cost analysis conducted for a baseline power station that employs a coal fired wet bottom boiler, that generates 320 MW of capacity at a net plant heat rate of 9800 Btu/kWh, that operates at an annual capacity factor of 65%, and that produces boiler baseline $NO_x$ emissions of 1.8 lbs/MBtu. It is assumed that this plant is required to lower $NO_x$ emissions from the baseline 1.8 lbs/MBtu by almost 90%, to 0.20 lbs/MBtu.

The first example describes the application of SNCR/SCR for a fixed set of process conditions at full load, in which SNCR/SCR is deployed in a manner to maximize $NO_x$ reduction consistent with minimum residual $NH_3$. For the wet-bottom boiler as described earlier, the maximum amount of catalyst that could be configured into a horizontal reactor is installed. For the SNCR component, an operating normalized stoichiometric ratio (NSR) of 0.75 is selected for operation of the proposed SNCR/SCR process, compared to 1.5 as typically necessary to generate sufficient residual $NH_3$ (around 350–450 ppm) to eliminate the need for a second reagent supply for SCR. For the application case described by the known SNCR/SCR processes, with SNCR NSR selected as 1.5, the annual reagent supply cost will be around $6.0M. For the SNCR/SCR process of the present invention, with the SNCR NSR selected as 0.75, the annual reagent supply will be around $3.2M. As a result, the present invention SNCR/SCR process can provide a reagent cost savings of around $2.8M annually. Accounting for both the lower reagent consumption and higher capital necessary for a second SCR reagent supply, the use of SNCR/SCR in the manner described by the present invention can lower $NO_x$ control cost from around $1600/ton to around $1400/ton for an SCR process alone.

The second example describes the use of SNCR/SCR in a manner in which operation of the SNCR component is relaxed, or even terminated when the boiler $NO_x$ production level decreases such that SCR alone can provide the required $NO_x$ control. Specifically, a case where boiler operation is at process conditions where SCR alone can deliver the necessary $NO_x$ reduction. If the average boiler $NO_x$ production rate for these conditions is 1.0 lbs/MBtu, and a reduction to 0.2 lbs/MBtu is required, the SCR process alone provides the necessary $NO_x$ reduction for virtually complete reagent utilization and requires $1.9M for reagent if extrapolated over an annual basis. Alternatively, if the known SNCR/SCR processes are deployed at this boiler $NO_x$ production rate of 1.0 lb/MBtu and the same $NO_x$ reduction requirement, the aggregate reagent utilization would be significantly less than 100%. Accordingly, the annual operating cost for deployment of the known SNCR/SCR processes would be around $4.3M, and thus exceed the cost for the operating mode described in this invention by around $2.1M annually. This significant operating cost premium is not compensated for by the modest capital cost savings that would be derived with a smaller SCR reactor.

The third example describes a situation in which the SNCR mode is deployed as described in the first two cases, with the exception that as SCR catalyst ages the $NO_x$ reduction provided by SNCR is increased slightly to extend the date at which catalyst must be replaced. Specifically, considered is a case for the reference plant described by this example in which the inability to control residual $NH_3$ to less than 10 ppm after 2 years requires a catalyst changeout.

An alternative embodiment of the process of the present invention is to increase SNCR NSR slightly, compensating for compromised SCR performance. In a case where SNCR NSR is increased from 0.35 to 0.45, increasing $NO_x$ reduction from 15% to 25%. At boiler $NO_x$ emissions of 1.5 lbs/MBu the SCR $NH_3$/NO ratio can be decreased from 0.85 to 0.82, allowing ammonia injected for SCR to be reduced by about 4%. Even though the ammonia is reduced by 4%, the total $NO_x$ reduction is maintained constant due to the slight increase in $NO_x$ control from SNCR. As a result of the lower SCR reagent injection rate, a lower reagent breakthrough to residual $NH_3$ is observed, decreasing residual $NH_3$ below the 10 ppm acceptable threshold. If this strategy extracts just one added year of catalyst life, the modest increase in reagent consumption (by about $400,000, from about $1.4 to about $1.8M annually) will allow significantly lower catalyst replacement cost. Specifically, extending catalyst life from 1 to 2 years lowers the effective annual cost for catalyst supply from about $5.2M for an annual catalyst change to about $3.55M for a two year change, providing a savings around $1.45M.

Each of these three examples demonstrates how the present invention SNCR/SCR process can provide cost savings over the known processes.

Thus, the present invention provides the minimum cost overall $NO_x$ control for some power plant installations, particularly high $NO_x$ emitting boilers. The levelized cost of $NO_x$ removal per ton removed by SNCR is dominated by reagent consumption cost and not by capital requirement. The reagent utilization is extremely important for high $NO_x$ emitting power plants. The known SNCR/SCR system designs which do not maximize reagent utilization, and thus do not minimize reagent cost, actually increase the cost of $NO_x$ control on a levelized per ton basis for certain power plant installations.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims, and their equivalents.

What is claimed is:

1. A process for reducing the amount of nitrogen oxides contained in a flue gas stream of a carbonaceous material combustion process, the process comprising the steps of:

providing means for introducing into the flue gas stream a first nitrogenous treatment agent effective in the selective non-catalytic reduction of nitrogen oxides;

providing means for introducing into the flue gas stream a second nitrogenous treatment agent effective in the selective catalytic reduction of nitrogen oxides, said means for introducing the second nitrogenous treatment agent located downstream from the means for introducing the first nitrogenous treatment agent;

providing a catalyst effective for the selective catalytic reduction of nitrogen oxides in the presence of said second nitrogenous treatment agent, said catalyst having a maximum effective nitrogen oxides level reducing capability;

selecting a non-zero baseline amount of first nitrogenous treatment agent to be the minimum amount of first nitrogenous treatment agent added during all periods the process is operating;

contacting the flue gas with at least said selected non-zero baseline amount of said first nitrogenous treatment agent causing at least a portion of the nitrogen oxides in the flue gas to be reduced by the selective non-catalytic reduction of nitrogen oxides during all periods when the flue gas stream contains nitrogen oxides;

contacting the flue gas with said second nitrogenous treatment agent;

then contacting the flue gas with said catalyst effective for the selective catalytic reduction of nitrogen oxides in the presence of said second nitrogenous treatment agent causing additional nitrogen oxides in the flue gas to be reduced by the selective catalytic reduction of nitrogen oxides; and wherein during periods when the level of nitrogen oxides in the flue gas exceeds the amount of nitrogen oxides which can be removed by the combination of selective non-catalytic reduction using said selected non-zero baseline amount of first nitrogenous treatment plus selective catalytic reduction using said maximum effective nitrogen oxides level reducing capability of said catalyst, additional first treatment agent is introduced into the flue gas stream in an amount effective to reduce the level of nitrogen oxides in the flue gas approximately to the level of said maximum effective nitrogen oxides level reducing capability of said catalyst.

2. The process of claim 1 wherein said first and second nitrogenous treatment agents are selected from the group consisting of ammonia and urea.

3. The process of claim 1 wherein said non-zero amount is the maximum amount of first nitrogenous treatment agent necessary for stoichiometric SNCR reduction during plant operating conditions producing a minimum level of nitrogen oxides without any measurable amount of ammonia in the flue gas stream after the SNCR stage.

4. The process of claim 3 wherein said catalyst has an activity which incrementally decreases over a period of time, the invention further comprising: incrementally increasing said non-zero baseline amount of first nitrogenous treatment agent added during all periods during which the process is operating over said period of time to compensate for the incremental decrease of said activity of said catalyst.

5. The process of claim 4 wherein said continuously introduced non-zero baseline amount of first nitrogenous treatment agent added during all periods during which the process is operating is initially increased at approximately two years after installation of the catalyst to compensate for the decrease of said activity of said catalyst.

6. In a process of reducing the amount of nitrogen oxides contained in a flue gas stream of a carbonaceous material combustion process, said process including:

providing means for introducing into the flue gas stream a first nitrogenous treatment agent effective in the selective non-catalytic reduction of nitrogen oxides;

providing means for introducing into the flue gas stream a second nitrogenous treatment agent effective in the selective catalytic reduction of nitrogen oxides, said means for introducing the second nitrogenous treatment agent located downstream from the means for introducing the first nitrogenous treatment agent;

providing a catalyst effective for the selective catalytic reduction of nitrogen oxides in the presence of said second nitrogenous treatment agent, said catalyst having a maximum effective nitrogen oxides level reducing capability;

contacting the flue gas with said first nitrogenous treatment agent reducing nitrogen oxides in the flue gas;

then contacting the flue gas with said catalyst effective for the selective catalytic reduction of nitrogen oxides in the presence of said second nitrogenous treatment agent reducing nitrogen oxides in the flue gas; and wherein, during periods when the level of nitrogen oxides in the flue gas exceeds the amount of nitrogen oxides which can be removed by the combination of said first nitrogenous treatment plus said maximum effective nitrogen oxides level reducing capability of said catalyst, first treatment agent is introduced into the flue gas stream in an amount effective to reduce the level of nitrogen oxides in the flue gas approximately to the level of said maximum effective nitrogen oxides level reducing capability of said catalyst; the improvement comprising:

continuously introducing into contact with the flue gas stream at all periods during the process a preselected non-zero baseline amount of said first nitrogenous treatment agent causing at least a portion of the nitrogen oxides in the flue gas stream to be reduced by selective catalytic reduction of nitrogen oxides during all periods during which the flue gas stream contains nitrogen oxides.

7. The process of claim 6 wherein said first and second nitrogenous treatment agents are selected from the group consisting of ammonia and urea.

8. The process of claim 7 wherein said continuously introduced non-zero baseline amount is the maximum amount of first nitrogenous treatment agent necessary for stoichiometric SNCR reduction during plant operating conditions producing a minimum level of nitrogen oxides without any measurable amount of ammonia in the flue gas stream after the SNCR stage.

9. The process of claim 8 wherein said catalyst has an activity which incrementally decreases over a period of time, the improvement further comprising: incrementally increasing said continuously introduced non-zero baseline amount of first nitrogenous treatment agent added during all periods during which the flue gas stream contains nitrogen oxides over said period of time to compensate for the incremental decrease of said activity of said catalyst.

10. The process of claim 9 wherein said continuously introduced non-zero baseline amount of first nitrogenous treatment agent added during all periods during which the flue gas stream contains nitrogen oxides is initially increased at approximately two years after installation of the catalyst to compensate for the decrease of said activity of said catalyst.

* * * * *